United States Patent
Merling et al.

(10) Patent No.: US 12,222,909 B1
(45) Date of Patent: Feb. 11, 2025

(54) SYSTEMS AND METHODS FOR IDENTIFYING RELEVANT DATA TO USE FOR ENRICHING DATA STRUCTURES IN LARGE DATASETS USING DETECTED METADATA CORRELATIONS

(71) Applicant: Capital One Services, LLC, McLean, VA (US)

(72) Inventors: Mark Merling, Arlington, VA (US); Tania Cruz Morales, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/501,630

(22) Filed: Nov. 3, 2023

(51) Int. Cl.
*G06F 16/21* (2019.01)

(52) U.S. Cl.
CPC ............... *G06F 16/211* (2019.01)

(58) Field of Classification Search
CPC ..................................... G06F 16/211
See application file for complete search history.

(56) References Cited

U.S. PATENT DOCUMENTS

| | | | |
|---|---|---|---|
| 11,836,138 B1 * | 12/2023 | Glickman | G06F 16/2455 |
| 12,008,001 B2 * | 6/2024 | Glickman | G06F 16/2456 |
| 2023/0385284 A1 * | 11/2023 | Glickman | G06F 16/2455 |
| 2023/0385286 A1 * | 11/2023 | Glickman | G06F 16/244 |

* cited by examiner

*Primary Examiner* — Baoquoc N To
(74) *Attorney, Agent, or Firm* — Foley & Lardner LLP (57) ABSTRACT

Systems and methods for uses and/or improvements to using artificial intelligence applications with large datasets. In particular, systems and methods for enriching data structures (e.g., data structures comprising user profile data) with additional data structures (and values thereof) from accessible data from a plurality of other users based on identifying relevant data to use for enriching the data structures using detected metadata correlations.

20 Claims, 4 Drawing Sheets

100

| User 19234 | |
|---|---|
| Food Bill | $540.43 |
| Phone Bill | $134.34 |
| Family Size: | ???? |
| High Spender | ???? |

120

| User 19234 | |
|---|---|
| Food Bill | $540.43 |
| Phone Bill | $134.34 |
| Family Size: | ???? |
| High Spender | ???? |

140

| User 19234 | |
|---|---|
| Food Bill | $540.43 |
| Phone Bill | $134.34 |
| Family Size: | 3 |
| High Spender | ???? |

160

| User 19234 | |
|---|---|
| Food Bill | $540.43 |
| Phone Bill | $134.34 |
| Family Size: | 3 |
| High Spender | No |

| Phone Bill | |
|---|---|
| First Line | $50.34 |
| Second Line | $42.00 |
| Third Line | $42.00 |
| Total | $134.34 |

230

| Number Correlation | |
|---|---|
| Phone Lines | Yes |
| Geography | No |
| Insurance Category | Yes |
| Car Types | Yes |

250

| Model Select | |
|---|---|
| Phone Lines | XNC12432 |
| Geography | 1321_DNDF |
| Insurance Category | YTH_122_1 |
| Car Types | 1-1-ABNE |

SYSTEMS AND METHODS FOR IDENTIFYING RELEVANT DATA TO USE FOR ENRICHING DATA STRUCTURES IN LARGE DATASETS USING DETECTED METADATA CORRELATIONS

BACKGROUND

Big data refers to extremely large and complex datasets that are beyond the capabilities of traditional data processing tools and methods to efficiently capture, store, manage, and analyze. The term "big data" is used to describe not only the volume of data but also its variety, velocity, and veracity. Big data involves a vast amount of data, typically on the order of terabytes, petabytes, or even exabytes. This data is generated from various sources, such as sensors, social media, transactions, and more. Big data comes in various formats, including structured data (like traditional databases), semi-structured data (like JSON or XML), and unstructured data (like text, images, videos). This diversity of data types presents challenges in terms of storage, processing, and analysis. Furthermore, data is being generated at an unprecedented speed, requiring real-time or near real-time processing. This is common in applications like social media analytics, financial trading, and Internet of Things (IoT) devices. Big data may have issues with accuracy and reliability due to inconsistencies, errors, and biases in the data sources. Managing and ensuring the quality of the data is crucial for meaningful analysis. The ultimate goal of dealing with big data is to extract valuable insights, trends, and patterns that can inform decision-making and provide a competitive advantage.

In particular, big data may be used to gather information about a system, entity, and/or user for profiling purposes. Data profiling is the process of analyzing and examining a dataset to understand its structure, content, quality, and overall characteristics. The goal of data profiling is to gain insights into the data (e.g., insights in the system, entity, and/or user), identify potential issues or anomalies, and prepare the data for further processing, analysis, or integration. These profiles may be especially useful for detecting patterns for artificial intelligence-based solutions.

Artificial intelligence, including, but not limited to, machine learning, deep learning, etc. (referred to collectively herein as "artificial intelligence models," "machine learning models," or simply "models"), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications and practical implementations of big data and artificial intelligence, their combination has been hindered by several technical problems.

First, despite the presence of seemingly unlimited data, the system must understand the format and structure of the data (such as identifying the types of columns, data ranges, and relationships between tables) in order to properly use it. Second, despite the availability of this data, even if its structure and format is understood, the use of this data (whether in training models based on it or otherwise processing it) requires computing resources. Thus, the presence of overwhelming data requires an appropriate mechanism for prioritizing and categorizing data based on its importance, urgency, and relevance.

SUMMARY

Systems and methods are described herein for novel uses and/or improvements to using artificial intelligence applications with large datasets. In particular, systems and methods are described herein for enriching data structures (e.g., data structures comprising user profile data) with additional data structures (and values thereof) from accessible data from a plurality of other users by identifying relevant data to use for enrichment based on detected metadata correlations.

To achieve this enrichment, the system may determine an additional metadata type that is not currently available in a first data structure (e.g., a data structure comprising user data). The system may then find this additional metadata type (and values therein) by a novel detection and extraction process. For example, the system may first filter the accessible data from the plurality of other users for data structure that shares a first metadata type (and/or value therein) with the first data structure. By doing so, the system may identify other data structures in the accessible data from the plurality of other users that are relevant (e.g., other data structures that include the same format, data source, etc., as well as specific values such as user identifiers, account numbers, etc.). The system may then determine a specific extraction model (e.g., a specific extraction algorithm) based on the first metadata type. The extraction model may be trained to identify correlations between the first metadata type and other metadata types to determine the one or more correlations between the first metadata type and the additional metadata type (e.g., what data structures, formats, data sources, and/or series of transformation are required to access the additional metadata types and values therein).

In some aspects, systems and methods for identifying relevant data to use for enriching data structures in large datasets using detected metadata correlations are described. For example, the system may receive user data, wherein the user data comprises a first data structure with a plurality of metadata types, and wherein the user data includes a first metadata type of the plurality of metadata types and a first value corresponding to the first metadata type. The system may filter accessible data for a plurality of users based on the first metadata type to generate a first subset of the accessible data that corresponds to the first metadata type. The system may select, based on the first metadata type, a first model of a plurality of models for extracting data from the first subset, wherein each of the plurality of models comprises a respective extraction algorithm. The system may generate a first input to the first model based on the first subset and the first value. The system may process the first input in the first model to generate a first output, wherein the first output comprises a second value corresponding to a second metadata type. The system may generate a second data structure for the user data by enriching the first data structure with the second value.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
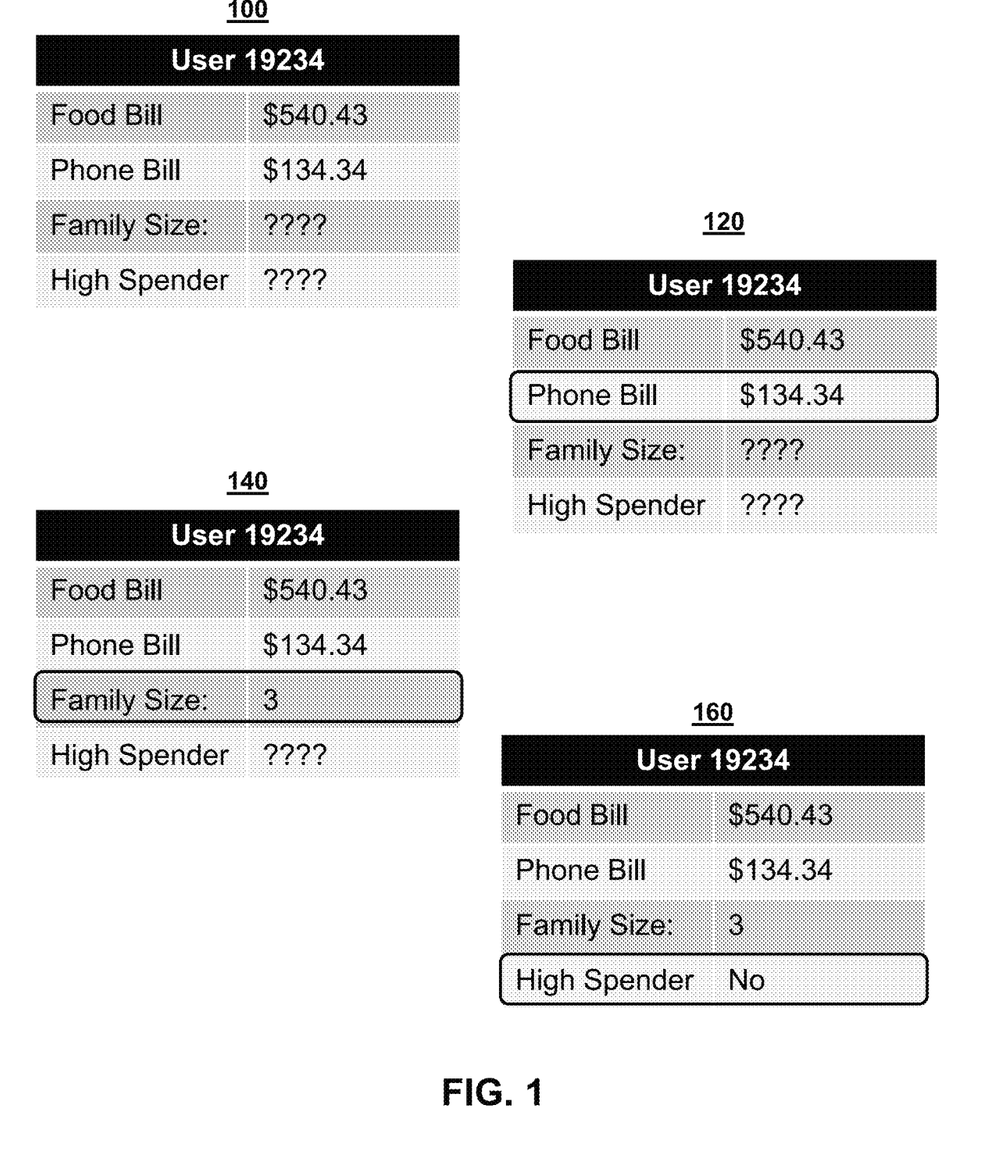
FIG. 1 shows illustrative diagrams for data structures, in accordance with one or more embodiments.

FIG. 1 shows illustrative diagrams for data structures, in accordance with one or more embodiments. For example, the system may determine an additional metadata type that is not currently available in a first data structure (e.g., a data structure comprising user data). The system may then find this additional metadata type (and values therein) by a novel detection and extraction process. For example, the system may first filter the accessible data from the plurality of other users for data structure that shares a first metadata type (and/or value therein) with the first data structure. By doing so, the system may identify other data structures in the accessible data from the plurality of other users that are relevant (e.g., other data structures that include the same format, data source, etc., as well as specific values such as user identifiers, account numbers, etc.). The system may then determine a specific extraction model (e.g., a specific extraction algorithm) based on the first metadata type. The extraction model may be trained to identify correlations between the first metadata type and other metadata types to determine the one or more correlations between the first metadata type and the additional metadata type (e.g., what data structures, formats, data sources, and/or series of transformation are required to access the additional metadata types and values therein).

As shown in FIG. 1, the system may receive user data (e.g., user data 100) available from a first source. The first source may comprise any data source. In some embodiments, the first source may comprise user profile data. For example, the system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user or a customized desktop environment. In some embodiments, the user profile may be a digital representation of a person's identity. The data in the user profile may be generated based on the system actively or passively monitoring.

User data 100 comprises a first data structure with a plurality of metadata types (e.g., "food bill" and "phone bill"). User data 100 includes a first metadata type of the plurality of metadata types (e.g., "food bill") and a first value corresponding to the first metadata type (e.g., "$540.43"). The metadata type and/or the value thereof may comprise any content. As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user-generated content may include content created and/or consumed by a user. For example, user-generated content may include content created by another but consumed and/or published by the user.

The system may receive a user input requesting a recommendation based on the user data. The system may receive the user input via a user interface. As referred to herein, a "user interface" may comprise a human-computer interaction and communication in a device and may include display screens, keyboards, a mouse, and the appearance of a desktop. For example, a user interface may comprise a way a user interacts with an application or a website. As shown in FIG. 1, the system may receive a request to determine whether a user corresponding to user data 100 is a "high spender." As further shown, the system may lack information (e.g., "family size") needed to interpret existing data (e.g., corresponding to "food bill" and "phone bill") to determine whether the user is a "high spender." For instance, if the system is trying to classify a user as a "high spender" or "moderate spender" based exclusively on transactional data, then a user with a larger family will likely be classified as a higher spender due to the cost of their family (e.g., a high value corresponding to "food bill"). If, instead, the system can leverage data about transactions that it does have about the customer as a surrogate for family size, the system can more accurately segment the user (and/or classify the user). Accordingly, the system may allow for recommendations to be more accurate, thus allowing for more successfully personalized offers, features, notifications, and/or other content for the user.

The system may then determine a second metadata type (e.g., "high spender") for enriching user data 120 that is required to generate the recommendation, wherein the plurality of metadata types does not include the second metadata type. For example, the system may identify first metadata (e.g., a phone bill of $134.34) that can be used based on a series of correlations to determine a value of the second metadata type.

For example, a transaction (e.g., a $134.34 recurring charge to the phone bill) may be used as a surrogate for determining other metadata types (e.g., "family size," "high spender," etc.) as this charge would be indicative that the customer likely has three phone lines, thus implying that there is a high likelihood of the user having three or more members of their household (e.g., as recorded in user data 140). The system may then determine that because the family size is "3," the "food bill" of "$540.43" is not high. Accordingly, the system may populate user data 160 with a value of "No" for the metadata type corresponding to "high spender."

Figure 2:
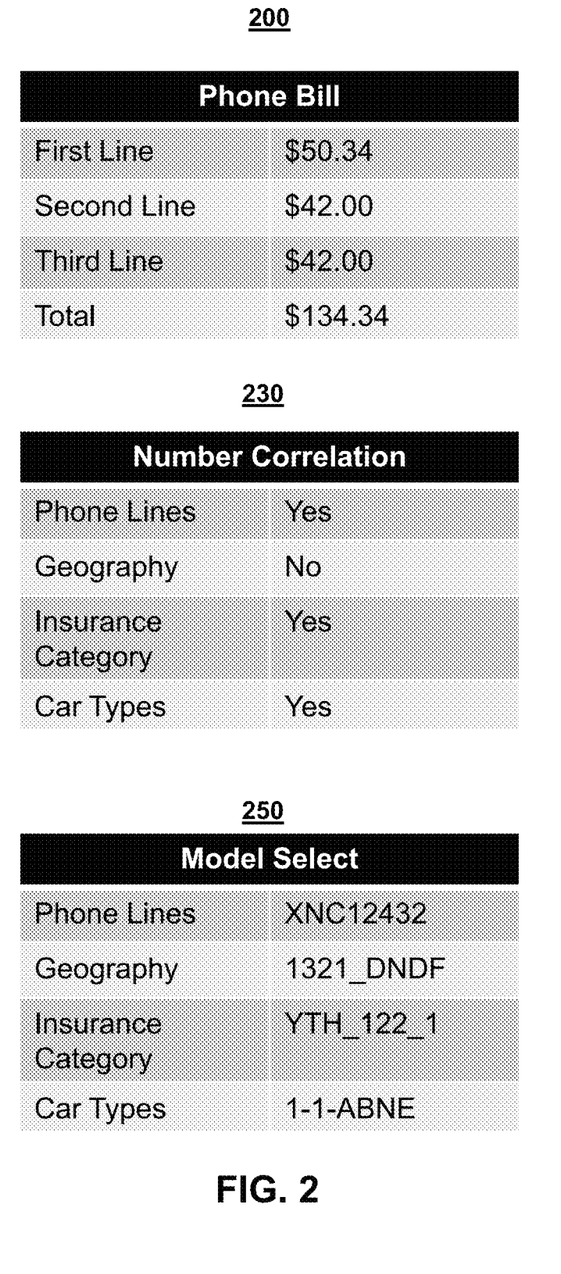
FIG. 2 shows an illustrative diagram for detecting correlations between metadata types, in accordance with one or more embodiments.

FIG. 2 shows an illustrative diagram for detecting correlations between metadata types, in accordance with one or more embodiments. For example, the system may manually delineate or may automatically (e.g., via one or more models) determine both correlations and/or values. In some embodiments, the system may recognize one or more metadata types that may be used (e.g., based on correlations) to identify other metadata types and/or values therefor.

For example, in response to identifying a metadata type and/or value therefor (e.g., a phone bill charge in user data), the system may access other data (e.g., from one or more data sources and/or corresponding to one or more other users). As shown in FIG. 2, the system may retrieve phone bill 200. Phone bill 200 may be retrieved from a set of phone bill records and/or may be determined to be related to a user. For example, the system may filter accessible data (e.g., phone bill records) for a plurality of users (e.g., from one or more users) based on the first metadata type (e.g., "phone bill" from user data 100 (FIG. 1)) to generate a first subset of the accessible data that corresponds to the first metadata type (e.g., to select a phone bill from the plurality of accessible phone bills that corresponds to the user).

As shown in dataset 230, the system may identify specific metadata types that correspond to other metadata types. As shown, dataset 230 may record values that indicate which types of metadata have a correlation between user data 100 (FIG. 1), including one or more metadata types and/or values thereof, and family size. As shown in dataset 230, "phone lines" does have a correlation to "family size." To identify correlations between metadata, the system may analyze patterns and relationships within the metadata to detect different attributes or elements that are related. For example, metadata, which provides information about other data, can itself hold valuable insights about the data it describes. For example, the system may implement algorithms and scripts to automatically analyze metadata.

To determine correlations, the system may first prepare the data by gathering metadata with associated values. For a dataset containing information about movies, each movie has metadata attributes like "genre," "release year," "box office revenue," and "runtime." The system may then standardize the metadata values. For instance, the system may convert "genre" values to a consistent format (e.g., lower-case) to ensure accurate comparisons. The system may then select a correlation calculation. For example, the system may choose appropriate correlation metrics based on the nature of the data. For numerical metadata attributes like "release year" and "box office revenue," a Pearson correlation coefficient can be used. The system may then calculate the Pearson correlation coefficient between pairs of numerical metadata attributes.

The system may then analyze the calculated correlation coefficients. A positive coefficient value (closer to +1) indicates that as one attribute increases, the other tends to increase as well. A negative coefficient value (closer to −1) indicates that as one attribute increases, the other tends to decrease. A coefficient value close to 0 suggests little to no linear relationship between the attributes.

The system may then conduct significance testing to determine if the observed correlation is statistically significant. This helps prevent drawing false conclusions due to random fluctuations in data. The system may also perform hypothesis testing, often involving t-tests, to assess whether the correlation coefficient significantly differs from zero.

The system may then train models to predict one metadata attribute based on others. For instance, a model could predict "box office revenue" based on "release year" and "genre." The system may then analyze the model's feature importance scores to understand which metadata attributes contribute significantly to predictions.

The system may then select, based on the first metadata type, a first model of a plurality of models for extracting data from the first subset, wherein each of the plurality of models comprises a respective extraction algorithm, and wherein each respective extraction algorithm determines one or more correlations between the first metadata type and the second metadata type. For example, these algorithms can identify commonalities and dependencies between different metadata attributes.

As shown in dataset 250, the system may have a plurality of models that are trained to detect correlations between specific types of data and/or extract correlations from specific types of data. Dataset 250 may list models trained using particular algorithms and/or on particular datasets. The system may select a model based on these characteristics. For example, if the metadata includes textual descriptions or annotations, natural language processing (NLP) techniques can be used to extract meaningful information from the text. This can help identify semantic relationships and correlations.

In some embodiments, the system may represent metadata as a graph, where metadata attributes are nodes and relationships between them are edges. Graph analysis techniques can then be applied to discover correlations and patterns in the metadata graph. Additionally or alternatively, if the metadata has a large number of attributes, dimensionality reduction techniques like principal component analysis (PCA) can be used to reduce the data to a smaller set of dimensions that still capture the most important correlations. PCA may be used in the model training and predictions, which are described in FIG. 3.

In some embodiments, the system may apply clustering algorithms to group similar metadata attributes together. This can help identify clusters of related attributes that might indicate correlations. Classification algorithms can also be used to predict relationships between metadata attributes. In some embodiments, particularly those that may include manual selection and/or review, the system may create visualizations, such as scatter plots, heatmaps, and network graphs, to visually explore the relationships and correlations between different metadata attributes.

In some embodiments, the system may use statistical techniques to calculate correlation coefficients between pairs of metadata attributes. Common correlation metrics include Pearson correlation coefficient, Spearman rank correlation, and Kendall's tau. If metadata includes timestamps or temporal information, time-series analysis techniques can be employed to identify temporal correlations and trends. As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., price) of an asset (e.g., security) over time.

This can be tracked over the short term, such as the price of a security on the hour over the course of a business day, or the long term, such as the price of a security at close on the last day of every month over the course of five years. The system may generate a time-series analysis. For example, a time-series analysis may be useful to see how a given asset, security, or economic variable changes over time. It can also be used to examine how the changes associated with the chosen data point compare to shifts in other variables over the same time period. For example, with regards to retail loss, the system may receive time-series data for the various sub-segments indicating daily values for theft, product returns, etc.

The time-series analysis may determine various trends such as a secular trend, which describes the movement along the term; a seasonal variation, which represents seasonal changes; cyclical fluctuations, which correspond to periodical but not seasonal variations; and irregular variations, which are other nonrandom sources of variations of series. The system may maintain correlations for this data during modeling. In particular, the system may maintain correlations through non-normalization as normalizing data inherently changes the underlying data that may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depend heavily on the normalization choices. Thus, normalization may lead to lower model performance and more model errors. The use of a non-parametric bias test alleviates the need for normalization while still allowing the methods and systems to determine a respective proportion of error detections for each of the plurality of time-series data component models. Through this unconventional arrangement and architecture, the limitations of the conventional systems are overcome. For example, non-parametric bias tests are robust to irregular distributions while providing an allowance for covariate adjustment. Since no distributional assumptions are made, these tests may be applied to data that has been processed under any normalization strategy or not processed under a normalization process at all.

As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time-series data as a data stream. A given increment (or instance) of the time-series data may correspond to a data stream segment.

For example, in some embodiments, the analysis of time-series data presents comparison challenges that are exacerbated by normalization. For example, a comparison of original data from the same period in each year does not completely remove all seasonal effects. Certain holidays such as Easter and Chinese New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2000 and 2001). This comparison ignores the moving holiday effect of Easter. Easter occurs in April for most years but if Easter falls in March, the level of activity can vary greatly for that month for some series. This distorts the original estimates. A comparison of these two months will not reflect the underlying pattern of the data. The comparison also ignores trading day effects. If the two consecutive months of March have different composition of trading days, it might reflect different levels of activity in original terms even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may in some cases be normalized to account for this issue, the normalization of one data stream segment (e.g., for one component model) may affect another data stream segment (e.g., for another component model). Individual normalizations may distort the relationship and correlations between the data leading to issues and negative performance of a composite data model.

As referred to herein, a "modeling error" or simply an "error" may correspond to an error in the performance of the model. For example, an error in a model may comprise an inaccurate or imprecise output or prediction for the model. This inaccuracy or imprecision may manifest as a false positive or a lack of detection of a certain event. These errors may occur in models corresponding to a particular sub-segment (e.g., a component model as described herein) that result in inaccuracies for predictions and/or output based on the sub-segment, and/or the errors may occur in models corresponding to an aggregation of multiple sub-segments (e.g., a composite model as described herein) that result in inaccuracies for predictions and/or outputs based on errors received in one or more of predictions of the plurality of sub-segments and/or an interpretation of the predictions of the plurality of sub-segments.

The system may then generate a first input to the first model based on the first subset and the first value. For example, a feature input (often referred to simply as a "feature") is an individual attribute or characteristic that is used as input to a model to make predictions or perform analysis. Features are the variables or dimensions that represent the data, and they play a crucial role in determining the model's output or behavior. A feature input is a specific piece of information or data that represents a particular aspect of the problem to be solved. It is a measurable property or quality associated with the data points or samples in the dataset.

The system may then process the first input in the first model to generate a first output based on the one or more correlations between the first metadata type and the second metadata type, wherein the first output comprises a second value corresponding to the second metadata type. The system may then generate a second data structure for the user data by enriching the first data structure with the second value (e.g., the system may generate user data 160 (FIG. 1) to include the second metadata type).

Figure 3:
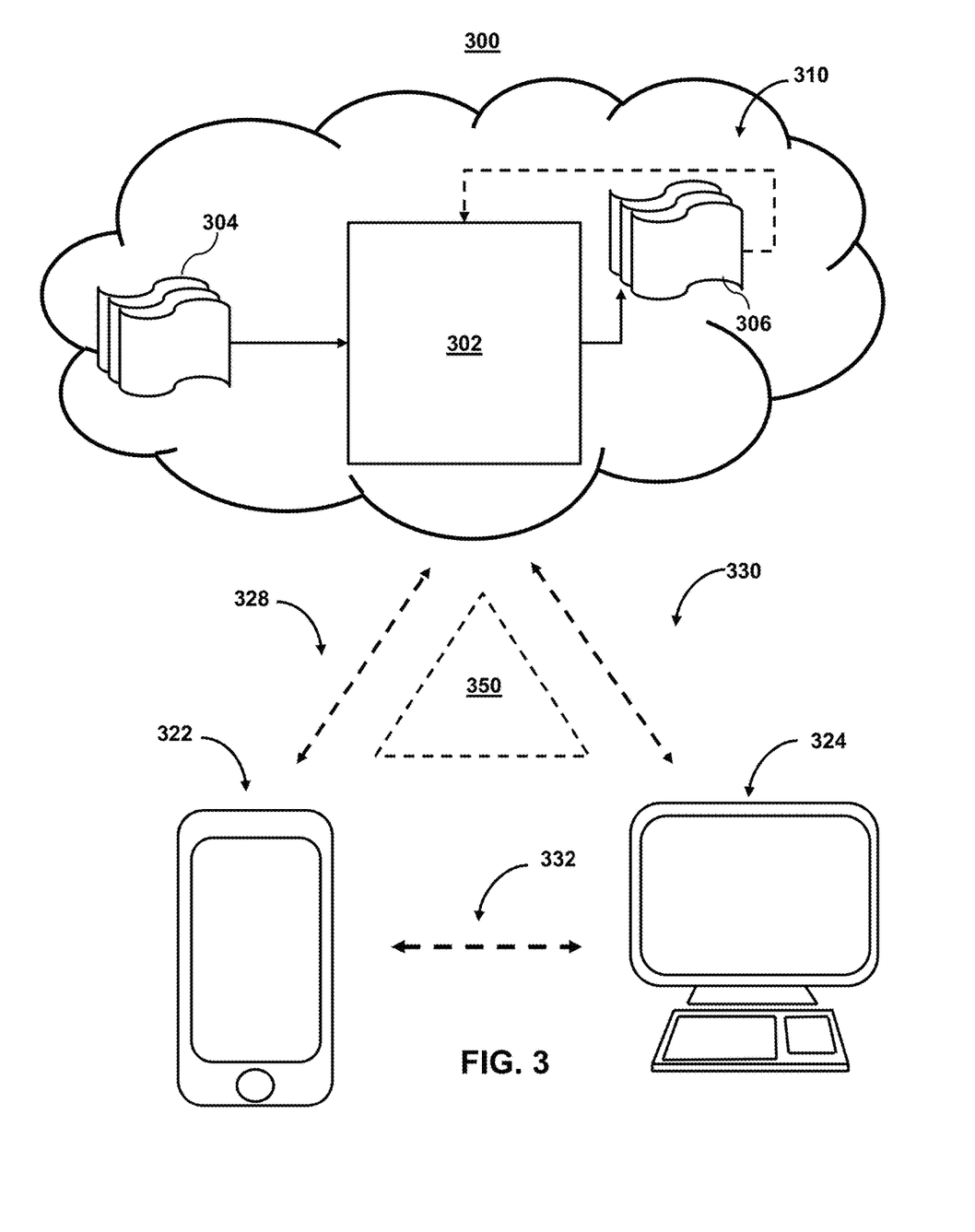
FIG. 3 shows illustrative components for a system used to identify relevant data to use for enriching data structures in large datasets using detected metadata correlations, in accordance with one or more embodiments.

FIG. 3 shows illustrative components for a system used to identify relevant data to use for enriching data structures in large datasets using detected metadata correlations, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., recommendations, correlations, training data, and/or data structures (or values therein)).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., recommendations, correlations, training data, and/or data structures (or values therein)).

In some embodiments, the model (e.g., model 302) may automatically perform actions based on outputs 306. In some embodiments, the model (e.g., model 302) may not perform any actions. The output of the model (e.g., model 302) may be used to generate recommendations, detect correlations, generate training data, and/or otherwise enrich data structures.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
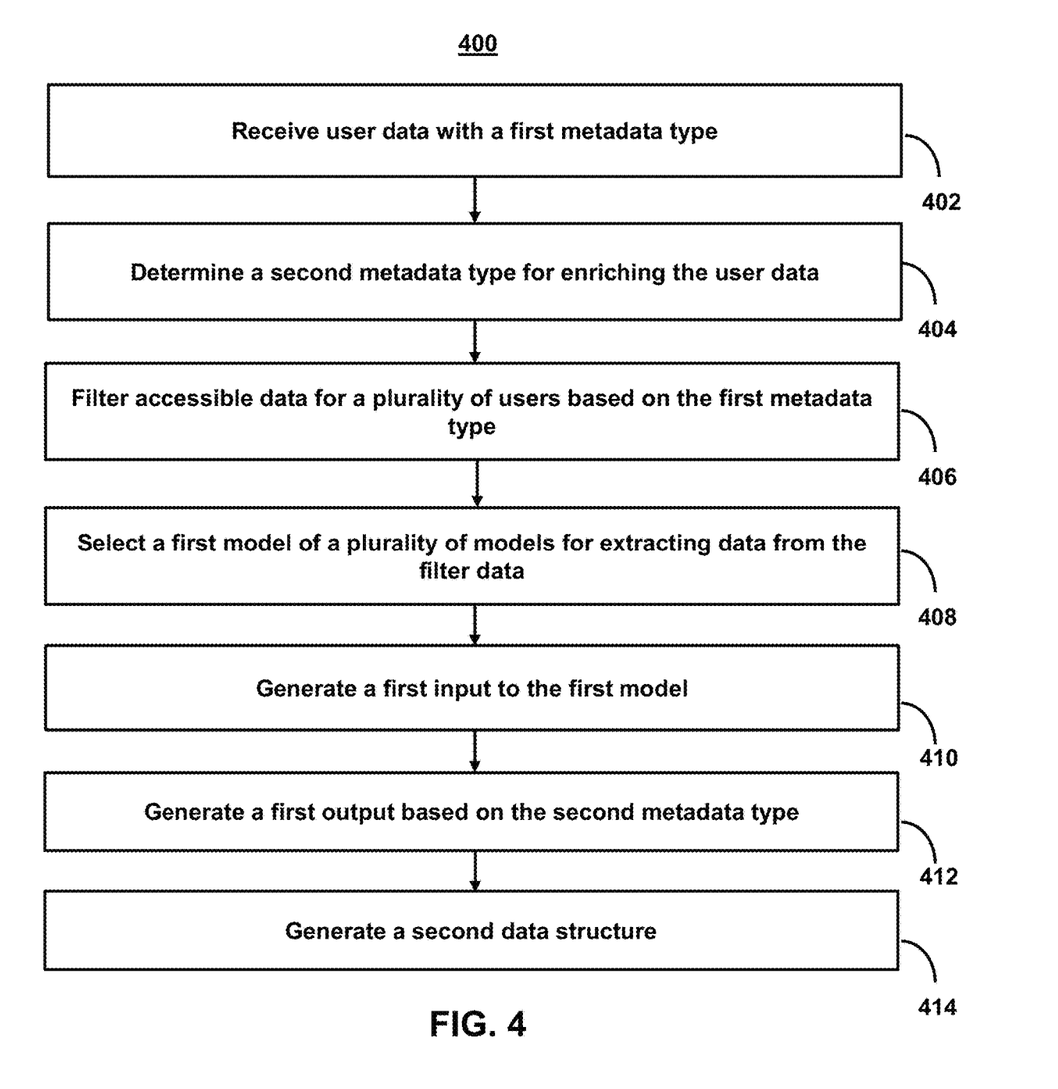
FIG. 4 shows a flowchart of the steps involved in identifying relevant data to use for enriching data structures in large datasets using detected metadata correlations, in accordance with one or more embodiments.

FIG. 4 shows a flowchart of the steps involved in identifying relevant data to use for enriching data structures in large datasets using detected metadata correlations, in accordance with one or more embodiments. For example, the system may use process 400 (e.g., as implemented on one or more system components described above) in order to determine an additional metadata type that is not currently available in a first data structure (e.g., a data structure comprising user data).

At step 402, process 400 (e.g., using one or more components described above) receives user data with a first metadata type. For example, the system may receive user data, wherein the user data comprises a first data structure with a plurality of metadata types, and wherein the user data includes a first metadata type of the plurality of metadata types and a first value corresponding to the first metadata type. For example, user data may include a file system (e.g., a file system data structure) that includes files representing recent transactions. The files in the file system can have metadata types such as "file name," "file type," "file size," "creation time," "modification time," or "owner" (e.g., the metadata types). The metadata can have values such as "March transactions," "csv," "489 KB," "Jan. 1, 2023," "Jan. 2, 2023" and "Admin," respectively (e.g., the metadata values).

In some embodiments, the first metadata type may have one or more formats, wherein the one or more formats describe encoded data, wherein the encoded data represents the user data in a processed format, and wherein the encoded data is used when filtering the accessible data. For example, the first metadata type can have an MP3 format, which describes the encoding format of the user data to which the first metadata is referring. Additionally or alternatively, the first metadata type is updated at an update frequency, wherein the update frequency represents the update frequency of the user data, and wherein the update frequency is used when filtering the accessible data. For example, the first metadata type can have an update frequency of every week that describes an interval of one week between user data updates. An update can include a modification or addition to the user data. Additionally or alternatively, the first metadata type includes an associated application, wherein the associated application is used to view or modify the user data, and wherein the associated application is used when filtering the accessible data. For example, the associated application can range from specific software programs (e.g., a word processor, spreadsheet application, or PDF viewer) to operating systems. The associated application can be used to open and interact with the data present in the user data and the associated data. Additionally or alternatively, the first metadata type is supported by a file library, wherein the file library includes software resources used to run applications to view or modify the user data, and wherein the file library is used when filtering the accessible data. For example, the file library can include scripts, code, or readme files pertaining to an application used to access or modify the user data. The system can then filter accessible data using the file library.

At step 404, process 400 (e.g., using one or more components described above) determines a second metadata type for enriching the user data. For example, the system may determine a second metadata type for enriching the user data, wherein the plurality of metadata types does not include the second metadata type. For example, the system may determine an additional value and/or metadata category that may be useful for one or more applications. The system may then determine other data from the plurality of available data that may correspond to this data.

At step 406, process 400 (e.g., using one or more components described above) filters accessible data for a plurality of users based on the first metadata type. For example, the system may filter accessible data for a plurality of users based on the first metadata type to generate a first subset of the accessible data that corresponds to the first metadata type. For example, the system may filter a database with customer data (e.g., accessible data) based on the metadata type associated with the data structure (e.g., file systems, XML documents, images, HTML documents) in order to identify data that may be relevant.

In some embodiments, filtering the accessible data for the plurality of users based on the first metadata type to generate the first subset of the accessible data that corresponds to the first metadata type may comprise the system determining a time period for the user data, wherein the time period describes a duration between a first time and a second time when the user data is created, and generating the first subset of the accessible data based on the time period for the user data. For example, the system may determine that user data was created between a first time and a second time. The system may filter the accessible data based on data associated with a time between the first time and the second time. By doing so, the system can identify relevant data corresponding to the user data.

At step 408, process 400 (e.g., using one or more components described above) selects a first model of a plurality of models for extracting data from the filter data. For example, the system may select, based on the first metadata type, a first model of a plurality of models for extracting data from the first subset, wherein each of the plurality of models comprises a respective extraction algorithm. For example, if the first metadata type is an image, the system may select a model to extract additional data from the image (e.g., taking a picture of a grocery receipt and identifying relevant components).

At step 410, process 400 (e.g., using one or more components described above) generates a first input to the first model. For example, the system may generate a first input to the first model based on the first subset and the first value. For example, the system may generate an input into the image detection model including a receipt from the first subset and an image from the user data. Specifically, the system can generate an input to the model that includes a receipt from the user and similar receipts from other users.

In some embodiments, the system may process various types of data to identify relevant data to use for enriching data structures in large datasets using detected metadata correlations. For example, the system may select from a plurality of models, wherein each of the plurality of models comprises a respective extraction algorithm, and wherein each respective extraction algorithm determines one or more correlations between the first metadata type and the second metadata type.

As one example, processing the first input in the first model to generate the first output may comprise the system receiving the user data, wherein the first metadata type is a username, wherein the username is a unique string of characters that identifies a specific user. The system may determine the respective extraction algorithm based on the first metadata type, wherein the respective extraction algorithm is a Boolean match algorithm. The system may compare the user data to the first subset based on the respective extraction algorithm. The system may generate a Boolean output to include in the second data structure. For example, the first metadata type could be a username. In order to filter the accessible data, the system may identify data with usernames (e.g., customer transaction records, call records, or account records). The system may select a model to extract additional information from the filtered accessible data based on the metadata type (e.g., based on entries with the same username). One algorithm the model can employ is a Boolean match algorithm that can compare the user data, specifically the username included in the user data, to the subset of data extracted from the filtered accessible data. The system can then generate a Boolean output to indicate either a True or False value corresponding to the similarity of the username in the user data and the usernames in the subset. By doing so, the system can enrich the user data using the second data structure, which can garner additional information based on similar usernames.

As one example, processing the first input in the first model to generate the first output may comprise the system receiving the user data, wherein the first metadata type is an address, and wherein the address is a string of alphanumeric characters representing a physical location. The system may determine the respective extraction algorithm based on the first metadata type, wherein the respective extraction algorithm is a fuzzy match algorithm. The system may compare the user data to the first subset based on the respective extraction algorithm. The system may generate an output to include in the second data structure. For example, fuzzy match algorithm can be selected to match addresses from the user data to the subset. By doing so, the system can enrich the user data using records correlated based on the same or similar addresses.

As one example, processing the first input in the first model to generate the first output may comprise the system receiving the user data, wherein the first metadata type is an address, and wherein the address is a string of alphanumeric characters representing a physical location. The system may determine the respective extraction algorithm based on the first metadata type, wherein the respective extraction algorithm is an exact match algorithm. The system may compare the user data to the first subset based on the respective extraction algorithm. The system may generate an output to include in the second data structure. For example, the first metadata type may equal an amount, and the algorithm may detect an exact match, which may identify specific values for high accuracies (e.g., transaction amounts).

As one example, processing the first input in the first model to generate the first output may comprise the system receiving the user data, wherein the first metadata type is an address, and wherein the address is a string of alphanumeric characters representing a physical location. The system may determine the respective extraction algorithm based on the first metadata type, wherein the respective extraction algorithm is an entity matching algorithm, and wherein an entity is the first metadata type. The system may compare the user data to the first subset based on the respective extraction algorithm. The system may generate an output to include in the second data structure. For example, the first metadata type may equal an entity (e.g., merchant), and the system may determine an entity identifier, which may be used to pull transactions corresponding to the entity identifier.

At step 412, process 400 (e.g., using one or more components described above) generates a first output based on the second metadata type. For example, the system may process the first input in the first model to generate a first output, wherein the first output comprises a second value corresponding to the second metadata type. For example, the system can generate an output that includes a second value and a second metadata type. For example, the output can include a value such as "household" (e.g., the second value) corresponding to a text field (e.g., a second metadata type).

In some embodiments, the system may process the first input in the first model to generate a first output by determining metadata types in the user data that do not match the first metadata type and determining the second metadata type based on it not matching the first metadata type. For example, the first metadata type may be an image. The system may process the subset of the associated data to identify data related to the user data (e.g., pertaining to the image). The system may identify a second metadata type as a credit card number. Since the metadata type credit card number is different than the first metadata type, the system can use the second metadata type to enrich the user data. For example, the credit card information may relate to the image if the image is a receipt.

At step 414, process 400 (e.g., using one or more components described above) generates a second data structure. For example, the system may generate a second data structure for the user data by enriching the first data structure with the second value. For example, the system can input the new generated information (e.g., household) into the user data. By doing so, the system can enrich the user data, which can lead to improvements in alternative uses that require the use of user data.

In some embodiments, enriching the first data structure with the second value may comprise appending the second value to the user data. For example, the system may append the second value (e.g., a credit card number or receipt) to the user data. By doing so, the system can add additional information pertaining to the user.

In some embodiments, enriching the first data structure with the second value may comprise inputting the second value into a model, wherein the model is trained to extract insights based on the user data and the second value. The system may receive, as output from the model, a user insight. The system may append the user insight to the user data. For example, the system can input a second value (e.g., receipt or transaction) into a model that can extract an insight from the value. For example, the insight may be that the user associated with the user data and the second value likely lives alone. The system can then append the insight to the user data, thereby enriching the data for future uses.

In some embodiments, the system may use the second data structure to generate a recommendation and/or other content. For example, the system may determine that the second data structure is required to generate a recommendation (e.g., whether a user is a high spender). In some embodiments, the recommendation may be generated in response to the system receiving a user input requesting a recommendation based on the user data.

In some embodiments, the system may enrich the first data structure with the second value. The system may generate a link to the first subset of the accessible data and append the link to the user data. For example, the system can identify a location in the subset of accessible data that corresponds to the second value in the accessible data. After identifying the location, the system can append the location to the user data for future reference.

In some embodiments, the system data structure may be used for training purposes. For example, the second data structure may be used to label training data for training a model by receiving a plurality of data points corresponding to the user data, categorizing each of the plurality of data points into one or more categories using a category identification module, wherein the category identification module uses the second data structure, and using the second data structure to label training data for future use with the first model. For example, the second data structure may be a username that can be added to the user data. The system can use the updated user data (e.g., the data after the second data structure is added) to categorize additional data from other user data sources. For example, the system can train the first model based on the updated user data. For example, the system can receive user data from other users that is similar to the user data (e.g., overlapping metadata types) and update the first model by training the model using the second data structure. Thus, when the system encounters similar data, the newly trained model can be used to enrich the user data. By doing so, the system can constantly improve the first model to more accurately label components in the subset.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for identifying relevant data to use for enriching data structures in large datasets using detected metadata correlations.
2. The method of the preceding embodiment, the method comprising: receiving user data, wherein the user data comprises a first data structure with a plurality of metadata types, and wherein the user data includes a first metadata type of the plurality of metadata types and a first value corresponding to the first metadata type; filtering accessible data for a plurality of users based on the first metadata type to generate a first subset of the accessible data that corresponds to the first metadata type; selecting, based on the first metadata type, a first model of a plurality of models for extracting data from the first subset, wherein each of the plurality of models comprises a respective extraction algorithm; generating a first input to the first model based on the first subset and the first value; processing the first input in the first model to generate a first output, wherein the first output comprises a second value corresponding to the second metadata type; and generating a second data structure for the user data by enriching the first data structure with the second value.

3. The method of any one of the preceding embodiments, the method comprising: determining a second metadata type for enriching the user data, wherein the plurality of metadata types does not include the second metadata type.

4. The method of any one of the preceding embodiments, wherein processing the first input in the first model to generate the first output further comprises: receiving the user data, wherein the first metadata type is a username, wherein the username is a unique string of characters that identifies a specific user; determining the respective extraction algorithm based on the first metadata type, wherein the respective extraction algorithm is a Boolean match algorithm; comparing the user data to the first subset based on the respective extraction algorithm; and generating a Boolean output to include in the second data structure.

5. The method of any one of the preceding embodiments, wherein processing the first input in the first model to generate the first output further comprises: receiving the user data, wherein the first metadata type is an address, and wherein the address is a string of alphanumeric characters representing a physical location; determining the respective extraction algorithm based on the first metadata type, wherein the respective extraction algorithm is a fuzzy match algorithm; comparing the user data to the first subset based on the respective extraction algorithm; and generating an output to include in the second data structure.

6. The method of any one of the preceding embodiments, wherein processing the first input in the first model to generate the first output further comprises: receiving the user data, wherein the first metadata type is an address, and wherein the address is a string of alphanumeric characters representing a physical location; determining the respective extraction algorithm based on the first metadata type, wherein the respective extraction algorithm is an exact match algorithm; comparing the user data to the first subset based on the respective extraction algorithm; and generating an output to include in the second data structure.

7. The method of any one of the preceding embodiments, wherein processing the first input in the first model to generate the first output further comprises: receiving the user data, wherein the first metadata type is an address, and wherein the address is a string of alphanumeric characters representing a physical location; determining the respective extraction algorithm based on the first metadata type, wherein the respective extraction algorithm is an entity matching algorithm, and wherein an entity is the first metadata type; comparing the user data to the first subset based on the respective extraction algorithm; and generating an output to include in the second data structure.

8. The method of any one of the preceding embodiments, wherein the first metadata type has one or more formats, wherein the one or more formats describe encoded data, wherein the encoded data represents the user data in a processed format, and wherein the encoded data is used when filtering the accessible data.

9. The method of any one of the preceding embodiments, wherein the first metadata type is updated at an update frequency, wherein the update frequency represents the update frequency of the user data, and wherein the update frequency is used when filtering the accessible data.

10. The method of any one of the preceding embodiments, wherein the first metadata type includes an associated application, wherein the associated application is used to view or modify the user data, and wherein the associated application is used when filtering the accessible data.

11. The method of any one of the preceding embodiments, wherein the first metadata type is supported by a file library, wherein the file library includes software resources used to run applications to view or modify the user data, and wherein the file library is used when filtering the accessible data.

12. The method of any one of the preceding embodiments, wherein processing the first input in the first model to generate the first output further comprises: determining metadata types in the user data that do not match the first metadata type; and determining the second metadata type based on it not matching the first metadata type.

13. The method of any one of the preceding embodiments, wherein filtering the accessible data for the plurality of users based on the first metadata type to generate the first subset of the accessible data that corresponds to the first metadata type further comprises: determining a time period for the user data, wherein the time period describes a duration between a first time and a second time when the user data is created; and generating the first subset of the accessible data based on the time period for the user data.

14. The method of any one of the preceding embodiments, wherein enriching the first data structure with the second value further comprises appending the second value to the user data.

15. The method of any one of the preceding embodiments, wherein enriching the first data structure with the second value further comprises: inputting the second value into a model, wherein the model is trained to extract insights based on the user data and the second value; receiving, as output from the model, a user insight; and appending the user insight to the user data.

16. The method of any one of the preceding embodiments, wherein enriching the first data structure with the second value further comprises: generating a link to the first subset of the accessible data; and appending the link to the user data.

17. The method of any one of the preceding embodiments, wherein the second data structure is used to label training data for training a model by: receiving a plurality of data points corresponding to the user data; categorizing each of the plurality of data points into one or more categories using a category identification module, wherein the category identification module uses the second data structure; and using the second data structure to label training data for future use with the first model.

18. One or more non-transitory, computer-readable mediums storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for identifying relevant data to use for enriching data structures in large datasets using detected metadata correlations, the system comprising:
one or more processors; and
a non-transitory, computer-readable medium having instructions recorded thereon that, when executed by the one or more processors, cause operations comprising:
receiving user data available from a first source, wherein the user data comprises a first data structure with a plurality of metadata types, and wherein the user data includes a first metadata type of the plurality of metadata types and a first value corresponding to the first metadata type;
receiving a user input requesting a recommendation based on the user data;
determining a second metadata type for enriching the user data that is required to generate the recommendation, wherein the plurality of metadata types does not include the second metadata type;
filtering accessible data for a plurality of users based on the first metadata type to generate a first subset of the accessible data that corresponds to the first metadata type;
selecting, based on the first metadata type, a first model of a plurality of models for extracting data from the first subset, wherein each of the plurality of models comprises a respective extraction algorithm, and wherein each respective extraction algorithm determines one or more correlations between the first metadata type and the second metadata type;
generating a first input to the first model based on the first subset and the first value;
processing the first input in the first model to generate a first output based on the one or more correlations between the first metadata type and the second metadata type, wherein the first output comprises a second value corresponding to the second metadata type; and
generating a second data structure for the user data by enriching the first data structure with the second value.

2. A method for identifying relevant data to use for enriching data structures in large datasets using detected metadata correlations, the method comprising:
receiving user data, wherein the user data comprises a first data structure with a plurality of metadata types, and wherein the user data includes a first metadata type of the plurality of metadata types and a first value corresponding to the first metadata type;
determining a second metadata type for enriching the user data, wherein the plurality of metadata types does not include the second metadata type;
filtering accessible data for a plurality of users based on the first metadata type to generate a first subset of the accessible data that corresponds to the first metadata type;
selecting, based on the first metadata type, a first model of a plurality of models for extracting data from the first subset, wherein each of the plurality of models comprises a respective extraction algorithm;
generating a first input to the first model based on the first subset and the first value;
processing the first input in the first model to generate a first output, wherein the first output comprises a second value corresponding to the second metadata type; and
generating a second data structure for the user data by enriching the first data structure with the second value.

3. The method of claim 2, wherein the second data structure is used to label training data for training a model by:
receiving a plurality of data points corresponding to the user data;
categorizing each of the plurality of data points into one or more categories using a category identification module, wherein the category identification module uses the second data structure; and
using the second data structure to label training data for future use with the first model.

4. The method of claim 2, wherein processing the first input in the first model to generate the first output further comprises:
receiving the user data, wherein the first metadata type is a username, wherein the username is a unique string of characters that identifies a specific user;
determining the respective extraction algorithm based on the first metadata type, wherein the respective extraction algorithm is a Boolean match algorithm;
comparing the user data to the first subset based on the respective extraction algorithm; and
generating a Boolean output to include in the second data structure.

5. The method of claim 2, wherein processing the first input in the first model to generate the first output further comprises:
receiving the user data, wherein the first metadata type is an address, and wherein the address is a string of alphanumeric characters representing a physical location;
determining the respective extraction algorithm based on the first metadata type, wherein the respective extraction algorithm is a fuzzy match algorithm;
comparing the user data to the first subset based on the respective extraction algorithm; and
generating an output to include in the second data structure.

6. The method of claim 2, wherein processing the first input in the first model to generate the first output further comprises:
receiving the user data, wherein the first metadata type is an address, and wherein the address is a string of alphanumeric characters representing a physical location;
determining the respective extraction algorithm based on the first metadata type, wherein the respective extraction algorithm is an exact match algorithm;
comparing the user data to the first subset based on the respective extraction algorithm; and
generating an output to include in the second data structure.

7. The method of claim 2, wherein processing the first input in the first model to generate the first output further comprises:
receiving the user data, wherein the first metadata type is an address, and wherein the address is a string of alphanumeric characters representing a physical location;
determining the respective extraction algorithm based on the first metadata type, wherein the respective extraction algorithm is an entity matching algorithm, and wherein an entity is the first metadata type;
comparing the user data to the first subset based on the respective extraction algorithm; and
generating an output to include in the second data structure.

8. The method of claim 2, wherein the first metadata type has one or more formats, wherein the one or more formats describe encoded data, wherein the encoded data represents the user data in a processed format, and wherein the encoded data is used when filtering the accessible data.

9. The method of claim 2, wherein the first metadata type is updated at an update frequency, wherein the update frequency represents the update frequency of the user data, and wherein the update frequency is used when filtering the accessible data.

10. The method of claim 2, wherein the first metadata type includes an associated application, wherein the associated application is used to view or modify the user data, and wherein the associated application is used when filtering the accessible data.

11. The method of claim 2, wherein the first metadata type is supported by a file library, wherein the file library includes software resources used to run applications to view or modify the user data, and wherein the file library is used when filtering the accessible data.

12. The method of claim 2, wherein processing the first input in the first model to generate the first output further comprises:
determining metadata types in the user data that do not match the first metadata type; and
determining the second metadata type based on it not matching the first metadata type.

13. The method of claim 2, wherein filtering the accessible data for the plurality of users based on the first metadata type to generate the first subset of the accessible data that corresponds to the first metadata type further comprises:
determining a time period for the user data, wherein the time period describes a duration between a first time and a second time when the user data is created; and
generating the first subset of the accessible data based on the time period for the user data.

14. The method of claim 2, wherein enriching the first data structure with the second value further comprises appending the second value to the user data.

15. The method of claim 2, wherein enriching the first data structure with the second value further comprises:
inputting the second value into a model, wherein the model is trained to extract insights based on the user data and the second value;
receiving, as output from the model, a user insight; and
appending the user insight to the user data.

16. The method of claim 2, wherein enriching the first data structure with the second value further comprises:
generating a link to the first subset of the accessible data; and
appending the link to the user data.

17. A non-transitory, computer readable medium storing instructions that, when executed by one or more processors, cause operations comprising:
receiving user data, wherein the user data comprises a first data structure with a plurality of metadata types, and wherein the user data includes a first metadata type of the plurality of metadata types and a first value corresponding to the first metadata type;
filtering accessible data for a plurality of users based on the first metadata type to generate a first subset of the accessible data that corresponds to the first metadata type;
selecting, based on the first metadata type, a first model of a plurality of models for extracting data from the first subset, wherein each of the plurality of models comprises a respective extraction algorithm;
generating a first input to the first model based on the first subset and the first value;
processing the first input in the first model to generate a first output, wherein the first output comprises a second value corresponding to a second metadata type; and
generating a second data structure for the user data by enriching the first data structure with the second value.

18. The non-transitory, computer readable medium of claim 17, wherein the second data structure is used to label training data for training a model by:
receiving a plurality of data points corresponding to the user data;
categorizing each of the plurality of data points into one or more categories using a category identification module, wherein the category identification module uses the second data structure; and
using the second data structure to label training data for future use with the first model.

19. The non-transitory, computer readable medium of claim 17, wherein processing the first input in the first model to generate the first output further comprises:
receiving the user data, wherein the first metadata type is a username, wherein the username is a unique string of characters that identifies a specific user;
determining the respective extraction algorithm based on the first metadata type, wherein the respective extraction algorithm is a Boolean match algorithm;
comparing the user data to the first subset based on the respective extraction algorithm; and
generating a Boolean output to include in the second data structure.

20. The non-transitory, computer readable medium of claim 17, wherein enriching the first data structure with the second value further comprises:
inputting the second value into a model, wherein the model is trained to extract insights based on the user data and the second value;
receiving, as output from the model, a user insight; and
appending the user insight to the user data.

* * * * *